United States Patent Office 2,942,010
Patented June 21, 1960

2,942,010
9-CHLORO-17α-HYDROXY CORTICOSTERONE AND PROCESS FOR ITS PREPARATION

David Taub, Metuchen, Norman L. Wendler, Summit, and C. Stewart Snoddy, Jr., Plainfield, N.J., assignors to Merck & Co., Inc., Rahway, N.J., a corporation of New Jersey No Drawing. Filed Oct. 31, 1955, Ser. No. 544,074

6 Claims. (Cl. 260—397.45)

This invention is concerned generally with novel steroid compounds and with novel processes of preparing them. More particularly, it relates to the novel compound, 9-chloro-17α-hydroxycorticosterone and with novel processes for preparing this compound starting with $\Delta^{9(11)}$-anhydro-hydrocortisone acetate. The 9-chloro-17α-hydroxycorticosterone and its acetate have been found to possess a high level of cortisone-like activity.

The 9-chloro-17α-hydroxycorticosterone, commonly called 9-chloro-hydrocortisone, can be chemically represented as follows:

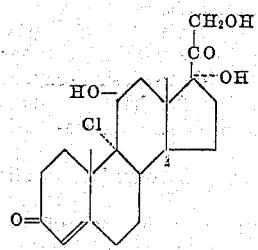

In accordance with the presently invented process, this compound is prepared by reacting $\Delta^{9(11)}$-anhydrohydrocortisone acetate (compound 1 hereinbelow) with an N-chloroamide in the presence of an inert solvent medium thereby forming directly 9-chloro-17α-hydroxycorticosterone acetate (compound 2) which, upon reaction with a hydrolyzing agent, forms 9-chloro-17α-hydroxycorticosterone (compound 3). The reactions nidicated above may be chemically represented as follows:

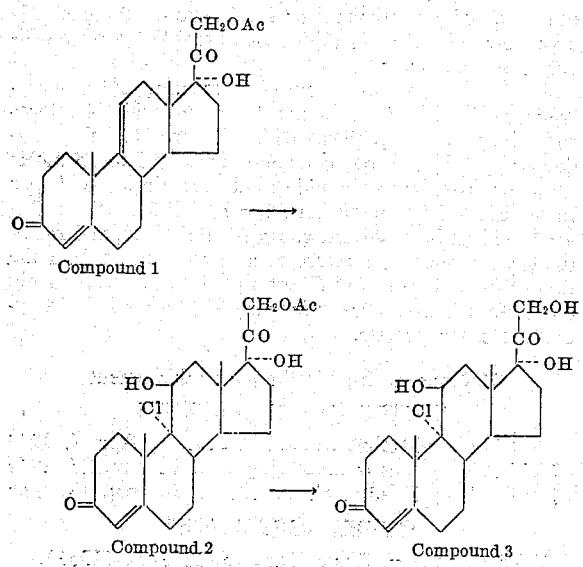

In carrying out the presently invented process, the $\Delta^{9(11)}$-anhydro-hydrocortisone acetate ($\Delta^{4,9(11)}$-pregnadiene-17α,21-diol-3,20-dione 21-acetate) is brought into intimate contact with a substantial molar excess of an N-chloroamide and perchloric acid in an inert solvent medium, and the resulting mixture is heated at a temperature within the range of about 25 to 45° C. until the reaction is complete as indicated by the disappearance of the solid material from the reaction mixture, which ordinarily requires a reaction period of approximately one to four hours. It is ordinarily preferred to use N-chlorsuccinimide in this reaction although other N-chloramides such as N-chloracetamide, and the like, can be used if desired.

The large excess of N-chloroamide, and the specified reaction conditions are critical to this reaction. Whereas the 9-bromo analog can be prepared by reacting $\Delta^{9(11)}$-anhydro-hydrocortisone acetate with approximately an equimolecular quantity of N-bromacetamide, attempts to prepare 9-chloro-17α-hydroxycorticosterone acetate by reacting 1.0 mole of $\Delta^{9(11)}$-anhydro-hydrocortisone acetate with 1.5 moles each of N-chlorsuccinimide and perchloric acid at the optimum reaction temperature fail to give an appreciable amount of 9-chloro-17α-hydroxycorticosterone acetate even after a reaction period of six hours. Accordingly, it was unobvious and unexpected that the utilization of a substantial molar excess i.e. between about 5 to 15 moles each of N-chloroamide and perchloric acid per mole of $\Delta^{9(11)}$-anhydro-hydrocortisone acetate would effect the desired reaction with a formation of the desired 9-chloro-17α-hydroxycorticosterone acetate ($\Delta^4$-pregnene-9α-chloro-11β,17α,21-triol-20-one 21-acetate) in a yield of over 60% of that theoretically obtainable.

Moreover, the reaction temperature has also been found to be critical since the utilization of even a large molar excess of N-chloroamide and perchloric acid (i.e. about 10 moles of each of these reactants per mole of $\Delta^{9(11)}$-anhydro-hydrocortisone acetate) has failed to give a significant yield of desired product when the reaction temperature is below this preferred range (e.g. 15° C.), and has resulted in extensive decomposition and tar formation when the reaction temperature is slightly more elevated than that range (e.g. 55° C.).

The N-chloroamide and perchloric acid are ordinarily used on an equimolar basis, that is, the same molar excess of each is employed. If desired, however, the relative proportions of these two reactants can be varied independently within the preferred range, providing that the excess of each of these reactants is sufficient to provide between about 5 and 15 moles of each reactant per mole of $\Delta^{9(11)}$-anhydro-hydrocortisone acetate.

The reaction is conveniently conducted by adding the N-chloroamide and perchloric acid (in the form of an aqueous solution) to a suspension of the $\Delta^{9(11)}$-anhydrohydrocortisone acetate in the inert solvent medium. As the solvent medium, it is preferred to employ a cyclic ether solvent such as dioxane, a dialkyl-alkanoylamide such as dimethylformamide, dimethylacetamide, and the like. The resulting suspension is maintained at a reaction temperature within the specified range, preferably with moderate stirring, until an essentially homogenous solution is obtained, at which time the reaction is substantially complete.

After the completion of the reaction, excess reagents are conveniently decomposed by the addition of reducing agents such as sodium sulfite, sodium bisulfite, and the like. The 9-chloro-17α-hydroxycorticosterone acetate is conveniently recovered from the resulting mixture by partially evaporating the solvents, whereupon the product is obtained as a crystalline mass. Alternatively, following decomposition of the excess N-chloroamide and perchloric acid, the reaction mixture is diluted with a saturated salt solution, whereupon the 9-chloro-17α-hydroxycorticosterone acetate crystallizes and may be recovered by filtration.

The 9-chloro-17α-hydroxycorticosterone acetate is conveniently hydrolyzed by reaction with an alkali metal alkoxide such as sodium methoxide in a lower alkanol such as methanol. The hydrolysis reaction is conducted at room temperature or above to give 9-chloro-17α-hydroxycorticosterone which can be recovered from the hydrolysis mixture by diluting it with water and filtering the precipitated material.

The following examples illustrate methods of carrying out the present invention, but it is to be understood that these examples are given for purposes of illustration and not of limitation.

Example 1

A mixture of 386 mg. of $\Delta^{4,9(11)}$-pregnadiene-17α,21-diol-3,20-dione 21-acetate (1 millimol), 20 ml. of dioxane, and 1.35 g. of N-chlorsuccinimide (8.9 millimol, 88% pure) is cooled to a temperature of about 15 to 20° C. To the cooled mixture is added 10 ml. of 1.04 N aqueous perchloric acid (10.4 millimol), and the resulting white suspension is stirred at a temperature of about 30° C. for a period of approximately three hours, at the end of which time most of the material dissolves to give a light yellow solution. The reaction solution is cooled to a temperature of about 10° C., a sufficient amount of aqueous sodium sulfite solution is added to discharge the excess N-chlorsuccinimide, and the resulting mixture is adjusted to neutrality by the addition of aqueous sodium bicarbonate solution. Most of the solvent is evaporated from the resulting mixture under reduced pressure while maintaining the temperature of the mixture within a range of about 25 to 30° C. The residual material is triturated with 150 ml. of water, and the partly non-crystalline mass completely solidifies on scratching. The light-yellow granular solid is recovered by filtration, washed with water, and air dried to give 395 mg. of crude material. This material is triturated with ether, and the crystalline material is recovered by filtration and dried to give 267 mg. of substantially pure 9-chloro-$\Delta^4$-pregnene-11β,17α,21-triol-3,20-dione 21-acetate; M.P. 196–201° C. dec.; yield approximately 60% of theory.

Example 2

A mixture of 386 mg. of $\Delta^{4,9(11)}$-pregnadiene-17α,21-diol-3,20-dione 21-acetate (1 millimol), 20 ml. of dioxane, and 1.35 g. of N-chlorsuccinimide (8.9 millimol, 88% pure) is cooled to a temperature of about 15 to 20° C. To the cooled mixture is added 10 ml. of 1.04 N aqueous perchloric acid (10.4 millimol), and the resulting white suspension is stirred at a temperature of about 30° C. for a period of approximately three hours, at the end of which time most of the material dissolves to give a light yellow solution. The reaction solution is cooled to a temperature of about 10° C., and sufficient amount of aqueous sodium sulfite solution is added to discharge the excess N-chlorsuccinimide. To the resulting mixture is added a saturated aqueous solution of sodium chloride, and the crystalline material which precipitates is recovered by filtration, dried and recrystallized from a mixture of acetone and ether to give substantially pure 9 - chloro - $\Delta^4$-pregnene-11β,17α,21-triol-3,20-dione 21-acetate.

Example 3

100 mg. 9-chloro-$\Delta^4$-pregnene-11β,17α,21-triol-3,20-dione 21-acetate is dissolved in methanol containing one molecular equivalent of sodium methoxide, and the resulting solution is allowed to stand at room temperature for about 10 minutes. The hydrolysis reaction solution is diluted with water, and the precipitated material is recovered by filtration, dried, and purified by recrystallization from a mixture of ethyl acetate and ether to give substantially pure 9 - chloro - 17α-hydroxycorticosterone (9-chloro-$\Delta^4$-pregnene-11β,17α,21-triol-3,20-dione).

Various changes and modifications may be made in carrying out the present invention without departing from the spirit and scope thereof. Insofar as these changes and modifications are within the purview of the annexed claims, they are to be considered as part of this invention.

We claim:

1. The process which comprises reacting $\Delta^{4,9(11)}$-pregnadiene-17α,21-diol-3,20-dione 21-acylate with approximately five to fifteen moles each of an N-chloroamide and perchloric acid per mole of $\Delta^{4,9(11)}$-pregnadiene compound at a temperature within the range of 25–45° C. thereby forming 9-chloro-17α-hydroxycorticosterone 21-acylate, and reacting the latter compound with a hydrolyzing agent to produce 9-chloro-17α-hydroxycorticosterone.

2. The process which comprises reacting $\Delta^{4,9(11)}$-pregnadiene-17α,21-diol-3,20-dione 21-alkanoate with approximately five to fifteen moles each of an N-chloroamide and perchloric acid per mole of $\Delta^{4,9(11)}$-pregnadiene compound at a temperature within the range of 25–45° C. thereby forming 9-chloro-17α-hydroxycorticosterone 21-alkanoate, and reacting the latter compound with a hydrolyzing agent to produce 9-chloro-17α-hydroxycorticosterone.

3. The process which comprises reacting $\Delta^{4,9(11)}$-pregnadiene-17α,21-diol-3,20-dione 21-acetate with approximately five to fifteen moles each of an N-chloroamide and perchloric acid per mole of $\Delta^{4,9(11)}$-pregnadiene compound at a temperature within the range of 25–45° C. thereby forming 9-chloro-17α-hydroxycorticosterone 21-acetate, and reacting the latter compound with a hydrolyzing agent to produce 9-chloro-17α-hydroxycorticosterone.

4. The process which comprises reacting $\Delta^{4,9(11)}$-pregnadiene-17α,21-diol-3,20-dione 21-acylate with approximately five to fifteen moles each of an N-chloroamide and perchloric acid per mole of $\Delta^{4,9(11)}$-pregnadiene compound at a temperature within the range of 25–45° C. thereby forming 9-chloro-17α-hydroxycorticosterone 21-acylate.

5. The process which comprises reacting $\Delta^{4,9(11)}$-pregnadiene-17α,21-diol-3,20-dione 21-alkanoate with an N-chloroamide and perchloric acid, said reaction being conducted by bringing together at a temperature within the range of about 25–45° C. approximately 5 to 15 moles each of N-chloroamide and perchloric acid per mole of $\Delta^{4,9(11)}$-pregnadiene-17α,21-diol-3,20-dione 21-alkanoate, thereby forming 9-chloro-17α-hydroxycorticosterone alkanoate.

6. The process which comprises reacting $\Delta^{4,9(11)}$-pregnadiene-17α,21-diol-3,20-dione 21-acetate with N-chlorosuccinimide and perchloric acid, said reaction being conducted by bringing together approximately 5 to 15 moles each of N-chlorosuccinimide and perchloric acid per mole of $\Delta^{4,9(11)}$-pregnadiene-17α,21-diol-3,20-dione 21-acetate in an inert solvent comprising dioxane, and maintaining the reaction mixture at a temperature within the range of about 25 to 45° C. for a period of approximately one to four hours, thereby forming 9-chloro-17α-hydroxycorticosterone acetate.

References Cited in the file of this patent

UNITED STATES PATENTS

| | | |
|---|---|---|
| 2,634,277 | Minlon | Apr. 7, 1953 |
| 2,707,190 | Farrar | Apr. 26, 1955 |
| 2,763,671 | Fried et al. | Sept. 18, 1956 |

OTHER REFERENCES

Fried, Jour. Am. Chem. Soc., 75, 2273–74 (1953).